United States Patent [19]

Iwako

[11] 4,222,339
[45] Sep. 16, 1980

[54] AUTOMATIC COMPOUND PATTERN GENERATION TYPE SEWING MACHINE

[75] Inventor: Akinobu Iwako, Tokyo, Japan

[73] Assignee: Kabushiki Kaisha Yaskawa Denki Seisakusho, Kitakyushu, Japan

[21] Appl. No.: 950,374

[22] Filed: Oct. 11, 1978

[30] Foreign Application Priority Data

Feb. 28, 1978 [JP] Japan .................................. 53-23839

[51] Int. Cl.² ............................................. D05B 3/02
[52] U.S. Cl. ................................................ 112/158 E
[58] Field of Search .......... 112/158 E, 121.12, 121.11; 318/568

[56] References Cited

U.S. PATENT DOCUMENTS

| | | | |
|---|---|---|---|
| 3,977,338 | 8/1976 | Wurst et al. ................ | 112/121.11 X |
| 4,016,821 | 4/1977 | Minalga ........................... | 112/158 E |
| 4,085,691 | 4/1978 | Coughenour et al. ........... | 112/158 E |
| 4,092,938 | 6/1978 | Coughenour et al. ........... | 112/158 E |
| 4,138,955 | 2/1979 | Garron ............................. | 112/158 E |
| 4,142,473 | 3/1979 | Itoh ................................. | 112/158 E |

FOREIGN PATENT DOCUMENTS

| | | | |
|---|---|---|---|
| 2721811 | 12/1977 | Fed. Rep. of Germany ...... | 112/121.11 |
| 2813220 | 10/1978 | Fed. Rep. of Germany ....... | 112/158 E |
| 50-101161 | 8/1975 | Japan ................................. | 112/158 E |
| 51-36414 | 10/1976 | Japan ................................. | 112/121.12 |
| 52-90357 | 7/1977 | Japan ................................. | 112/158 |

Primary Examiner—Peter P. Nerbun
Attorney, Agent, or Firm—Fitzpatrick, Cella, Harper & Scinto

[57] ABSTRACT

An automatic pattern generation type sewing machine having a digital signal generator for outputting digital signals corresponding to stitch positions of a stitch pattern provided by the use of a signal synchronous with the arm shaft of the sewing machine is so improved that a plurality of sets of parameters can be successively applied to the digital signal generator and quadrants of a stitch pattern can be designated to form a more complicated, compound pattern.

3 Claims, 7 Drawing Figures

FIG. 3

| ADDRESS | h | SB | SF | FULL | INV | ENV1 | ENV2 | REV1 | REV2 | N |
|---|---|---|---|---|---|---|---|---|---|---|
| 0 | GIVING 7 INTERPOLATION POINTS | - | 3 | - | o | o | o | o | o | - |
| 1 | GIVING NO INTERPOLATION POINTS | - | - | o | o | o | o | - | o | - |
| ... | | o------o | o------o | o------o | o------o | o------o | o------o | o------o | o------o | o------o |

FIG. 4

| 13 | 14 | 15 | 16 | h  | FULL | REV1  |
|----|----|----|----|----|------|-------|
| 9  | 10 | 11 | 12 | SB | INV  | REV2  |
| 5  | 6  | 7  | 8  | SF | ENV1 | ENTER |
| 1  | 2  | 3  | 4  | N  | ENV2 | CLEAR |

F I G. 5
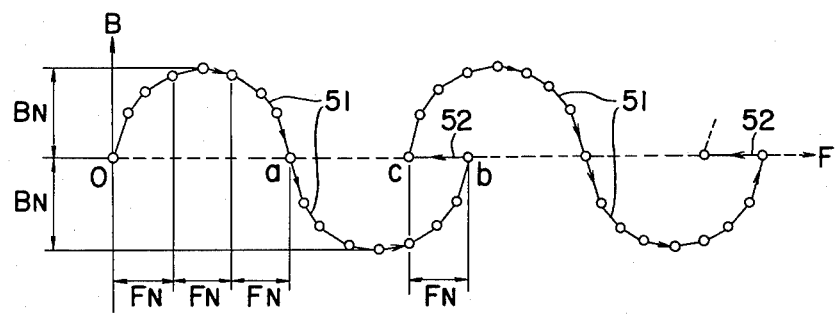
F I G. 6
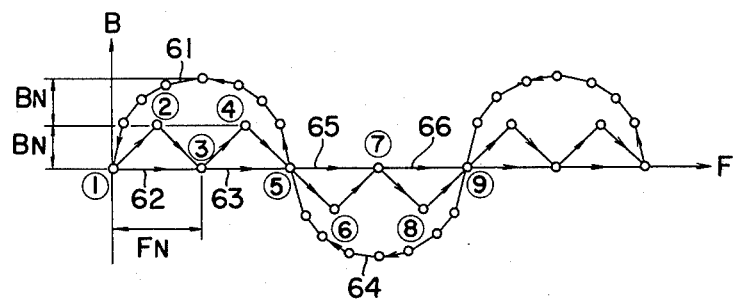
F I G. 7
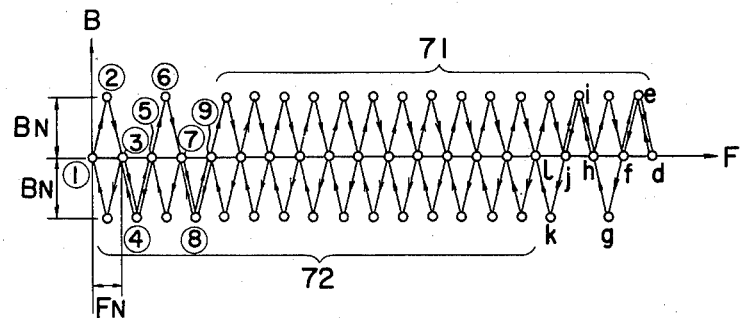

AUTOMATIC COMPOUND PATTERN GENERATION TYPE SEWING MACHINE

BACKGROUND OF THE INVENTION

This invention relates to automatic pattern generation type sewing machines in which a plurality of geometrical patterns are automatically generated by using a specially designed calculator, and more particularly to an automatic compound pattern generation type sewing machine in which intricate, compound patterns can be automatically formed by using a plurality of sets of parameters.

The applicant filed U.S. Patent Application No. Ser. No. 945,119 on Sept. 25, 1978, entitled "Automatic Pattern Generation Type Sewing Machine". This sewing machine per se has significant industrial merits; however, since it is provided for repeatedly generating a single pattern from one set of parameters, it is impossible to form an intricate pattern. In addition, the sewing machine cannot specify a quadrant where a pattern should be stitched.

SUMMARY OF THE INVENTION

Accordingly, an object of the invention is to provide an automatic compound pattern generation type sewing machine in which an intricate, compound pattern can be formed.

Another object of the invention is to provide an automatic compound pattern generation type sewing machine in which a quadrant where a pattern should be stitched can be specified.

The foregoing objects and other objects of the invention have been achieved by the provision of an automatic compound pattern generation type sewing machine comprising a function generating device for generating through a calculation, stitch positions in the form of a stitch pattern by using a signal synchronous with rotation of the arm shaft of the sewing machine, and a digital signal generating device for outputting digital signals corresponding to the stitch positions, in which machine a plurality of sets of parameters are applied successively to the digital signal generating device, and parameters for designating quadrants of a pattern where stitching is carried out are provided.

The nature, principle and utility of the invention will become more apparent from the following detailed description and the appended claims when read in conjunction with the accompanying drawings.

BRIEF DESCRIPTION OF THE DRAWINGS

In the accompanying drawings:

FIG. 3 is an explanatory diagram showing a state of the addresses in the parameter group register where parameters are set;

FIG. 4 is an explanatory diagram showing keys on a switch panel; and

FIGS. 5, 6 and 7 show concrete examples of a pattern generated by the pattern generating device shown in FIG. 1.

DETAILED DESCRIPTION OF THE INVENTION

Figure 1:
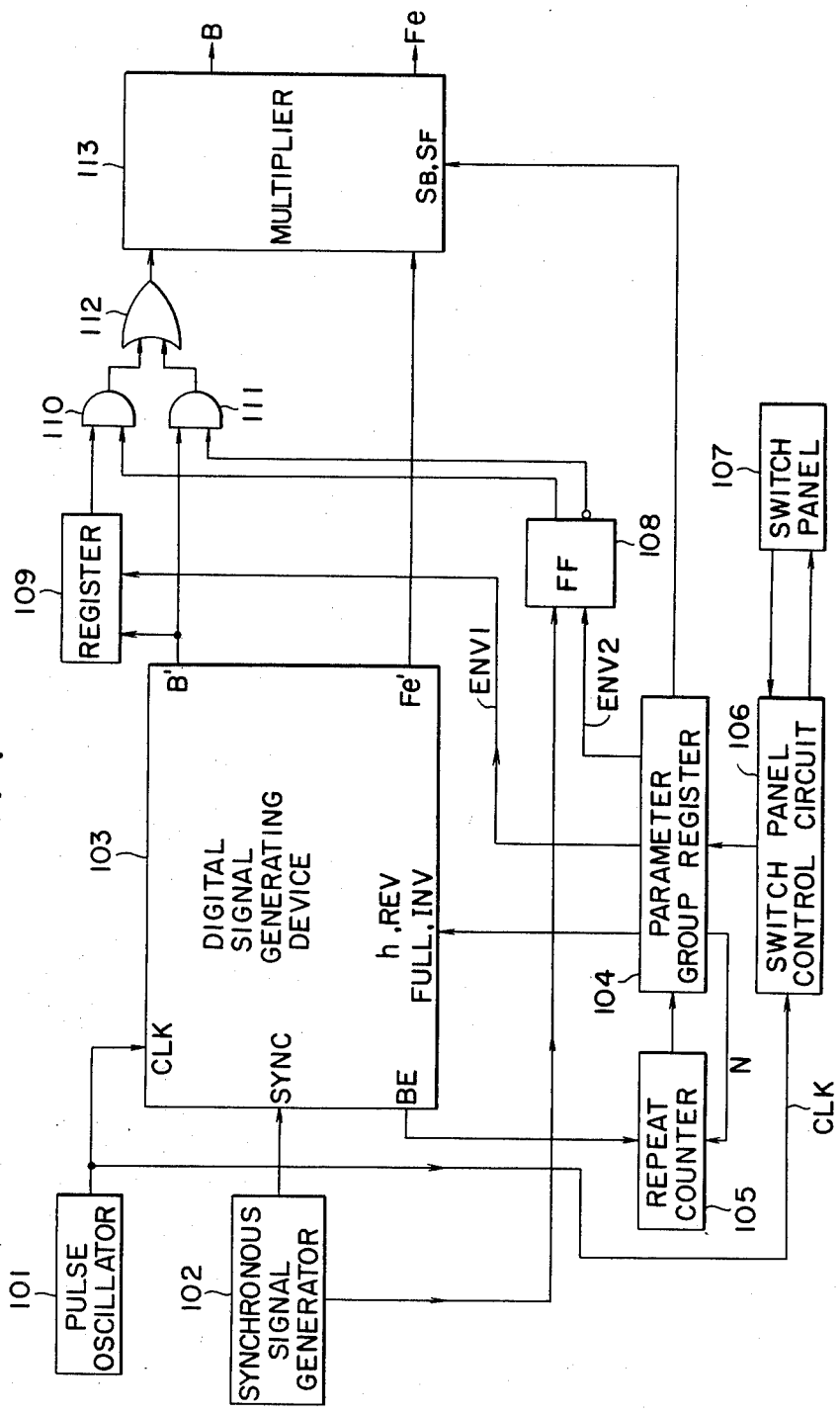
FIG. 1 is a block diagram showing a pattern generating device according to the invention.

One example of an automatic compound pattern generation type sewing machine, as shown in FIG. 1, comprises: a pulse oscillator 101 for generating clock pulses; a synchronous signal generator 102 for generating a signal synchronous with the rotation of the arm shaft of a sewing machine (not shown); and a digital signal generating device 103 which is provided with a function generating device for calculating the stitch positions in a stitch pattern similarly as that described in the aforementioned Japanese Patent Application.

In this example of the invention, a parameter INV (inversion) for inverting the sign of bight data is added to the parameters so as to deliver a signal BE (block end) representative of the completion of one fundamental block.

The pattern generating device further comprises: a parameter group register block 104; a repeat counter block 105, a switch panel control circuit block 106; a switch panel 107; a flip-flop circuit; a register 109; AND circuits 110 and 111; and an OR circuit 112.

The flip-flop circuit 108 counts up with the rise of the synchronous signal. Upon application of an envelope sequence designating signal ENV1 or ENV2 from the parameter group register block 104, the flip-flop circuit 108 permits the AND circuit 110 and 111 to perform a sequence control of obtaining a bight B' alternately from the digital signal generating device 103 and the register 109.

When no envelope is designated, the AND circuit 111 is maintained open, so that the bight data signal B' of the digital signal generating device 103 is applied directly to the multiplier 113.

In order to designate the size of an actual stitch pattern, parameters $S_B$ and $S_F$ are applied to the multiplier 113 from the parameter group register block 104. As a result, the bight data B' and feed data Fe' are multiplied by $S_B$ and $S_F$ to provide actual bight data B and feed data Fe.

The counter block 105 is a circuit which controls the number of times of repetition of the fundamental block of a stitch pattern specified by a set of parameters. Referring to a number-of-times parameter N, the repeat counter block 105 outputs a signal for advancing an address counter (described later) when stitching is achieved the desired number of times.

The parameter group register block 104 is to store and output parameters applied thereto from the switch panel 107, and is provided with a parameter group register (described later) in which one address is assigned to one set of parameters.

The switch panel control circuit 106 operates to deliver a signal corresponding to a key depressed in the switch panel 107 to the parameter group register block 104.

Figure 2:
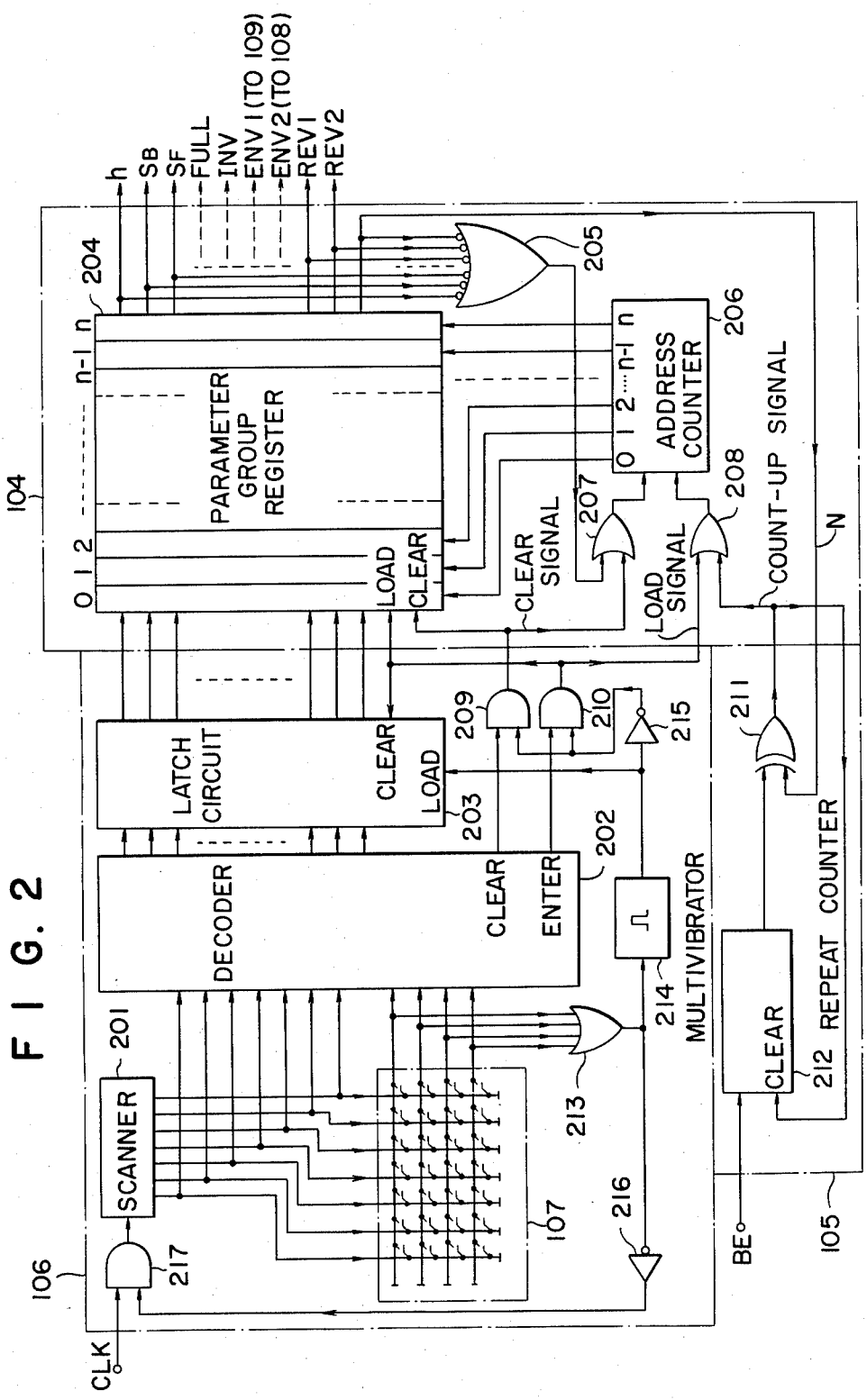
FIG. 2 is a block diagram showing a parameter group register and its related circuits shown in FIG. 1.

FIG. 2 is a detailed block diagram showing the parameter group register block 104 and its related circuits.

In FIG. 2, a scanner 201 receives the clock pulse CLK from the pulse oscillator 101 to scan a key matrix at all times.

Upon depression of a key, application of the clock pulse CLK to the scanner 201 is suspended by an OR circuit 213, a NOT circuit 216 and an AND circuit 217, as a result of which a signal representative of the key thus depressed is applied to a decoder 202 by the scanner 201.

In FIG. 2, reference numeral 214 designates a one-shot multivibrator, the signal delivery time of which is longer than the time required for terminating the chattering of a key. Accordingly, a latch circuit 203 can retain a stable decoder output obtained after the termination of key chattering.

The latch circuit 203 holds parameters for one fundamental block. More specifically, the parameters specified are successively held by the latch circuit 203 and they are loaded in a specified address in a parameter group register 204 upon depression of a key ENTER. Immediately after this, the latch circuit 203 is cleared for receiving parameters for the next fundamental block.

In an address counter 206, first an address signal is applied to the 0-th address, and then the following addresses are specified successively up to the last (n-th) address by the address signal in response to the count-up signal from the counter block 105, and the 0-th address is specified again. The cycle is repeatedly carried out by the address counter 206.

When, out of the total n addresses in the parameter group register 204, the 0-th address through the m-th address are specified but the remaining addresses are not specified, the address specification is returned to the 0-th address from the m-th address irrespective of the remaining addresses ((m+1)-th address, (m+2)-th address ... n-th address). This can be understood from the fact that, when all the outputs of the parameter group register 204 are "0", a clear signal is applied through an OR circuit 207 to the address counter 206 with the aid of a NAND circuit 205.

The one fundamental block completion signal BE is a signal which restores the entire digital signal generating device 103 to its initial state and has a final point discriminating function. A signal which corresponds to the number-of-times parameter N and is provided when stitching is made N times is compared with the output of a repeat counter 212 in a comparison circuit 211, the output of which is applied as a count-up signal to the address counter 206 through an OR circuit 208.

A method of applying the parameters will be described. Before application of the parameters, a key CLEAR on the switch panel 107 is depressed to clear the parameter group register 204 and simultaneously to set the address counter 206 to the 0-th address. That is, simultaneously when the clear signal is applied to an AND circuit 209 by the decoder 202, a signal obtained by inverting a signal from the one-shot multivibrator 214 by a NOT circuit 215 is applied to the AND circuit 209. As a result, a clear signal is applied to the parameter group register 204 and to the address counter 206 through the OR circuit 207 by the AND circuit 209.

After a set of parameters are specified on the switch panel 107, a key ENTER is depressed on the switch panel 107. As a result, the load signal is applied through an AND circuit 210 to the parameter group register 204 and the address counter 206, the address signal is applied to the first address in the parameter group register 204, and a latch signal from the latch circuit 203 is loaded in the 0-th address in the parameter group register 204.

The above-described operation is repeatedly performed so that a plurality of sets of parameters are set in the respective addresses in the parameter group register 204.

FIG. 3 shows a state of the addresses in the parameter group register in which parameters are set. In FIG. 3, reference characters "h" designates the interpolation pitch; "$S_B$", the bight data multiplying factor; "$S_F$", the feed data multiplying factor; "FULL", the full-amplitude pattern designating parameter; "INV", the bight data sign inverting parameter; "ENV1", the envelope one-side designating parameter; "ENV2", the envelope both-sides designating parameter; "REV1", the reverse designating parameter; "REV2", the triple stitch designating parameter; and "N", the number-of-repetition-times designating parameter.

In the case of FIG. 3, an interpolation pitch giving seven interpolation points, the bight data multiplying factor "1", the feed data multiplying factor "3", the full-amplitude pattern, and the number-of-repetition-times "1" are set as parameters in the 0-th address; and the bight data multiplying factor "1", the feed data multiplying factor "1", and the number-of-repetition-times "1" are set in the first address; however on interpolation pitch is specified, and the reverse instruction is specified for the first address.

FIG. 4 shows the keys on the switch panel. More specifically, the switch panel is provided with the numerical value keys "1" through "16", and the parameter keys for designating the above-described parameters.

A signal for loading the parameters is provided by depressing the key ENTER, and the parameter group register is cleared by depressing the key CLEAR. The parameters h, $S_B$, $S_F$ and N are designated by depressing desired numerical value keys after the respective parameter keys.

For instance, in designating the parameter h=1, the key h is depressed, as a result of which a register (not shown) for specifying the parameter h in the latch circuit 203 is selected, and thereafter the numerical value key "1" is depressed. Thus, the value "1" is stored in the register adapted to specify the parameter h.

The output of the register adapted to specify the parameter h is connected to a parameter h specifying region in the parameter group register 204. Upon depression of the key ENTER, the parameter h=1 is stored in the parameter group register 204.

Storing the other parameters $S_B$, $S_F$ and N is carried out in the same manner as described above.

When no numerical value key is depressed, a logical level signal "0" is specified. When the parameter keys FULL, INV, ENV1, ENV2, REV1 and REV2 are depressed, these parameters are specified and logical level signals "1" are stored in the respective addresses. If they are not depressed, they are not specified and the logical level signals "0" are stored in the respective addresses.

FIGS. 5, 6 and 7 shows examples of a pattern generated.

FIG. 5 illustrates a pattern generated by designating the parameters as indicated in FIG. 3.

In FIG. 5, reference characters B and F designate the bight direction and the feed direction, respectively; and $B_N$ and $F_N$, the standardized bight data and feed data, respectively.

Stitching is started at the point 0 and seven stitches are formed. Then, the bight data B is shifted from the positive side to the negative side and seven stitches are formed again. Thus, a pattern 51 set in the 0-th address has been formed, ending at the point b. Then, a pattern 52 set in the first address is formed, terminating at the point c. Thereafter, formation of these two patterns 51 and 52 are repeatedly carried out.

In the case of FIG. 6, an interpolation pitch h giving one interpolation point, a bight data multiplying factor $S_B=1$, a feed data multiplying factor $S_F=1$, and a number-of-repetition-times $N=2$ are set in the 0-th address, an interpolation pitch h giving seven interpolation point, a bight data multiplying factor $S_B=2$, a feed data multiplying factor $S_F=2$, a reverse REV1, and a number-of-repetition-times $N=1$, are set in the first address, and $h=0$, $S_B=1$, $S_F=1$, REV1, and $N=1$ are set in the second address.

Stitching is made in the order of points ①→②→③→④→⑤ by the parameters in the 0-th address, a line 61 is formed by the parameters in the first address, and lines 62 and 63 are formed by the parameters in the second address.

If the parameter INV in addition to the parameters specified for the first address is set in the third address, the parameter INV in addition to the parameters specified for the second address is set in the fourth address, and the parameter INV in addition to the parameters specified for the third address is set in the fifth address, then stitching is made in the order of points ⑤→⑥→⑦→⑧→⑨, and lines 64, 65 and 66 are formed.

If no parameters are set in the remaining addresses, the above-described operation is repeatedly performed.

The parameter INV relates to only the bight data to change the sign thereof, and the parameter REV1 relates to only the feed data to change the sign thereof. Therefore, a quadrant of a stitch pattern can be determined by the parameters INV and REV1 in the stitching operation.

In the case of FIG. 7, an interpolation pitch h giving one interpolation point, a bight data multiplying factor $S_B=1$, a feed data multiplying factor $S_F=1$, a full-amplitude pattern FULL, and a number-of-repetition-times $N=2$ are set as parameters in the 0-th address, $h=1$, $S_B=1$, $S_F=1$ and $N=15$ are set in the first address, the reverse REV1 in addition to the parameters provided for the 0-th address is set in the second address, and the reverse REV1 in addition to the parameters specified for the first address is set in the third address.

Stitching is made in the order of points ①→②...⑧→⑨ by the parameters in the 0-th address, a zigzag pattern 71 is formed by the parameters in the first address. Fifteen stitches are provided up to the point d on the feed axis F in the formation of the pattern 71.

Stitching is made in the order of points d→e→f... j→k→l by the parameters in the second address, and a zigzag pattern 72 is formed by the parameters in the third address. Fifteen stitches are provided up to the stitch ① below the feed axis F in the formation of the zigzag pattern 72. Thereafter, the above described operation is repeatedly carried out.

As is apparent from the above description, according to the second aspect of the invention, a plurality of sets of parameters can be set. Therefore, an intricate pattern can be readily stitched.

I claim:

1. In an automatic pattern generation type sewing machine, a digital signal generating device including function generation means for calculating stitch positions in accordance with a function and selected input parameters and means for outputting digital signals corresponding to the calculated stitch positions, said function generation means being operable in accordance with signals synchronous with the rotation of the arm shaft of the sewing machine, and means for successively applying different sets of parameters to said digital signal generating device to vary the stitch positions calculated in accordance with the function.

2. A machine as claimed in claim 1, wherein said applying means applies parameters for designating the quadrants for the stitch pattern.

3. A machine according to claim 1, wherein said applying means further applies parameters for varying the output from said digital signal generating device.

* * * * *

UNITED STATES PATENT AND TRADEMARK OFFICE
CERTIFICATE OF CORRECTION

PATENT NO. : 4,222,339
DATED : September 16, 1980
INVENTOR(S) : AKINOBU IWAKO

It is certified that error appears in the above—identified patent and that said Letters Patent are hereby corrected as shown below:

Column 2, line 13, change "Japanese" to --U.S.--.

Signed and Sealed this

Seventeenth Day of February 1981

[SEAL]

Attest:

RENE D. TEGTMEYER

Attesting Officer

Acting Commissioner of Patents and Trademarks